United States Patent [19]

Ramont et al.

[11] 3,943,856

[45] Mar. 16, 1976

[54] HOT GAS GENERATORS, POWDER CHARGES THEREFOR, AND PROCESS OF PRODUCTION THEREOF

[75] Inventors: Jacques P. A. Ramont, Bourges; André C. Jean, Conflans-Ste. Honorine; Léon M. Puydebois, Paris; Claude R. Rousse, Rueil; Michel Massay, Levallois-Perret, all of France

[73] Assignee: Etat Francais, Paris Armees, France

[22] Filed: June 21, 1974

[21] Appl. No.: 481,843

[30] Foreign Application Priority Data

July 13, 1973 France .................. 73.25702

[52] U.S. Cl. ............... 102/103; 60/39.47; 60/255; 102/39
[51] Int. Cl.² ........................................ F42B 1/00
[58] Field of Search ................... 102/99–103, 102/38, 39; 60/255, 256, 39.47

[56] References Cited
UNITED STATES PATENTS

| 726,901 | 5/1903 | Gathmann | 102/101 |
|---|---|---|---|
| 2,813,487 | 11/1957 | Miller et al. | 102/103 |
| 3,017,744 | 1/1962 | Jett | 60/39.47 |
| 3,407,595 | 10/1968 | Peterson | 60/39.47 |

FOREIGN PATENTS OR APPLICATIONS 2,053,681 4/1971 France

*Primary Examiner*—Stephen C. Bentley
*Assistant Examiner*—Harold Tudor
*Attorney, Agent, or Firm*—Larson, Taylor & Hinds

[57] ABSTRACT

In a hot gas generator with lamellar powder charge, the charge comprises a plurality of powder lamellae disposed side by side at regularly spaced intervals and projecting from a flexible shoe in which they are anchored by partial penetration into the shoe of anchoring teeth provided along one marginal edge portion of each lamella, so that between two teeth of the same lamella there is a communication aperture communicating the spaces on each side of the lamella. This permits instantaneous balancing of pressures between the various spaces, and minimizes the amount of the lamellae outside the normal process of combustion. The powder charge is assembled in the form of a mat with upstanding lamellae, and the mat or shoe is then shaped and formed to conform to a selected portion of the combustion chamber of a hot gas generator. In producing the charge, the lamellae are arranged and temporarily fixed to a first plate, with the anchoring teeth remote therefrom, and the first plate is then brought into facing relationship with a second plate on which a layer of polymerizable or curable plastic has been spread, such that the anchoring teeth partially penetrate and implant themselves in the plastic, after which the plastic is polymerized or cured, and the plates removed.

10 Claims, 5 Drawing Figures

HOT GAS GENERATORS, POWDER CHARGES THEREFOR, AND PROCESS OF PRODUCTION THEREOF

FIELD OF THE INVENTION

The invention relates to hot gas generators whose function results from combustion of a very rapidly burning powder charge (duration of combustion, of the order of a few milliseconds to a few centiseconds), generating a very considerable output of hot gases (of the order, for example, of about a hundred or several hundred kg/second), such hot gas generators being usable, for instance, in the propulsion of self-propelled projectiles, in the firing of a projectile from a recoilless gun, in igniting the solid propellant charge of a rocket stage, etc.

BACKGROUND AND SUMMARY

It has already been proposed, in French application No. 69/23972 of July 15, 1969, now French Pat. No. 2,053,681 of Apr. 16, 1971 that the powder charge of such hot gas generators be constituted by a plurality of lamellae of powder disposed side by side and fixed by a continuous peripheral zone to a common support (hereinafter called "shoe"), which arrangement simultaneously ensures a predetermined relative positioning of the said lamellae with respect to each other, the imparting to the charge assembly of the character of a single block, and the fixing of the charge thus constituted to the combustion chamber wall of the hot gas generator.

However, this earlier solution has not yielded entire satisfaction for certain uses, because it requires, for the anchoring of each lamella to the common shoe, a continuous fixation zone along which a continuous marginal strip (of no inconsiderable width) of the lamella in question will be embedded in the body of the shoe.

This arrangement entails the drawback of subtracting from the normal combustion process all this marginal strip embedded in the shoe, and at the end of combustion considerable residues remain (in shop jargon called "leftover plugs" or "leftover carrots") that escape the normal combustion process and continue to burn, emitting tongues of flame and smoke prejudicial to the concealment of mechanisms equipped with such hot gas generators. Moreover, the continuity of the lamella fixation zone forms, at the level of the implantation of such lamellae, a kind of barrier that prevents any communication between the compartments defined by said lamellae, which impedes the balancing of pressures there, reduces combustion output, and causes risk of rupture or tearing in the implantation zones of the said lamellae.

The invention is intended to obviate these drawbacks of hot gas generators with a one-piece lamellar powder charge, whereof the lamellae are implanted in a common shoe along a continuous marginal zone of fixation.

The invention thus relates to the development of a hot gas generator with lamellar powder charge, in which on the one hand the portion of the lamellae outside the normal process of combustion is less, and wherein on the other hand there is, upon firing of the charge, an almost instantaneous balancing of pressures between the various compartments defined by the said lamellae.

The powder hot gas generator of the invention comprises a one-piece lamellar powder charge, constituted by a plurality of lamellae of powder disposed side by side, regularly spaced, and fixed to a common shoe that ensures the relative positioning of the said lamellae with reference to each other, allowing fixation of the one-piece charge thus constituted to the combustion chamber wall of the hot gas generator, said generator being characterized in that each lamella comprises, in its marginal zone along which it is fixed to the common shoe, anchoring teeth embedded over only part of their height in the said shoe, so that between any two successive teeth of the same lamella there will be an aperture constituting a communication between the spaces on either side of the said lamella.

Because of this arrangement, there is on the one hand reduction to the minimum of the portion of the powder lamellae that does not participate in the normal combustion process, which portion is solely limited to the embedded parts of the lamella anchoring teeth, and on the other hand because of the apertures in question, it is possible to effect communication between the various compartments separating the successive lamellae, which communication allows a balancing of pressures between said compartments from the beginning of the combustion resulting in an increase in combustion yield and better mechanical resistance of the one-piece powder charge unit to the dynamic forces of the gases.

It is well to note, to avoid any ambiguity in the matter of the term "lamella," that this term designates thin flat elements, advantageously between a few tenths of a millimeter and a few millimeters, the contour of the lamellae generally but not necessarily being quadrangular, especially rectangular.

In this case, i.e., in the case of rectangular lamellae, the width or height is preferably between 5 and 50 mm.

The anchoring teeth of the lamellae then advantageously have a height and length that is between one tenth and one third of the width of said lamellae.

As to the number of anchoring teeth provided along the marginal fixation zone of each lamella, this is obviously a function, among other parameters, of the length of the said fixation zone, but it seems that the anchoring teeth in question may advantageously be provided, within the dimensional ranges preferentially indicated above for the lamellae and their anchoring teeth, in a proportion of one tooth for every 2 to 6 centimeters along the marginal fixation zone.

In the above described case of rectangular lamellae, the marginal fixation zone will be along the large side of the lamellae.

In any case, the depth of implantation of the anchoring teeth in the fixation shoe is preferably between one quarter and three quarters of the height of said teeth, said implantation depth being advantageously of the order of half the height of the teeth.

As used herein, the width or height of, for instance, a rectangular lamella is the dimension of the main rectangular portion, measured normally to the shoe or mat, and the length is measured normally to the width or height. The height and length measurements of the anchoring teeth are measured as indicated in FIG. 2 of the drawings.

As far then as the shoe that serves as support for such a lamellar charge is concerned, it is preferably made of flexible polymerizable plastic, advantageously of the silicone family, such a shoe then preventing the advantage of being readily adaptable to the combustion chamber wall and of lending itself to an advantageous anchoring process, which will be more explicitly described below.

In this matter, preferably a "flat" manufacturing process is chosen, which leads to production of a blank that enters into the framework of the invention and that is presented as a kind of lamellar mat, whereof one of the faces is constituted by the outer portion of the shoe and the other by the outer portion of the powder lamellae, disposed parallel to one another.

It is then possible to cut from this lamellar mat, pieces that correspond to the developed surface of the finished charge, and then if necessary adapt these pieces to the geometric characteristics of the combustion chamber wall on which the lamellar powder charge is to be fixed, e.g. by adhesion.

Thus, in the case of a cylindrical combustion chamber whose side wall may receive a lamellar powder charge, a rectangular or square blank will be cut from the mat, one of the dimensions corresponding to the length of the charge and the other to the external circumference, said blank then being rolled to a cylindrical configuration.

The process of the invention for the manufacture, starting with a mat of a lamellar powder charge whereof the lamellae are anchored in the shoe by means of teeth provided along the marginal fixation zone of each lamella, is characterized by the following successive stages:

provisional fixation on a first plate, of sheets of toothed powder lamellae disposed in parallel and adjacent, or separated from one another;

spreading on a second plate, of a layer (possibly reinforced with glass fabric) of polymerizable plastic material, said layer being intended to constitute the charge shoe;

before polymerization of said layer is completed, putting said first and second plates in a mounting arrangement so designed that the teeth of the lamellae will be partly embedded in the shoe in the course of polymerization;

completion of the polymerization of the shoe;

removal of the two plates, the shoe then enclosing the teeth of the powder lamellae (partly embedded teeth);

cutting out the lamellar charge thus prepared;

shaping the said charge, if necessary, for its adaptation in the combustion chamber of the hot gas generator.

DESCRIPTION OF THE DRAWINGS

To illustrate the various arrangements in question, preferred (but non limitative) embodiments will now be described, with reference to the attached drawing, in which.

DESCRIPTION OF THE PREFERRED EMBODIMENTS

Figure 1:
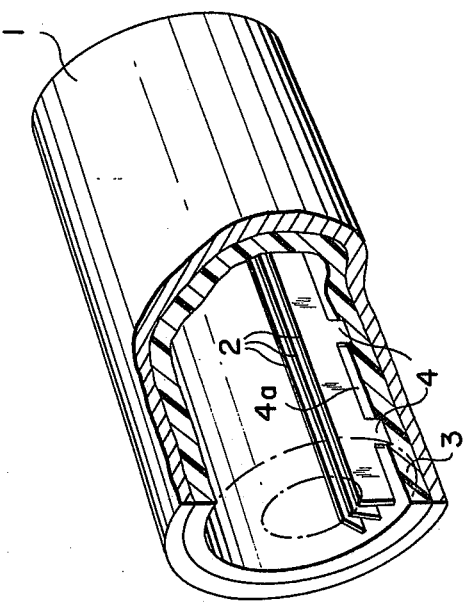
FIG. 1 shows, in perspective and with cut parts and cut away parts, a hot gas generator with a propulsion function, designed according to the invention.

FIG. 1 shows a hot gas generator, with large gaseous output and short duration of combustion, for propulsion of a projectile, said generator comprising a cylindrical envelope 1 whose lateral wall, of a diameter of 112 mm, is lined with a lamellar one-piece powder charge constituted by a plurality of powder lamellae 2, rectangular in configuration, disposed in radial planes and regularly separated from each other. Each lamella has a thickness of 0.3 mm, a length of 165 mm, and a width of 12.6 mm. The charge unit comprises 490 lamellae, but for the sake of clarity in the drawing, this number has been considerably reduced.

Each lamella 2 is anchored in a common shoe 3 of flexible plastic, of the silicone family, said shoe itself adhering to the internal wall of envelope 1.

In accordance with the invention, each powder lamella 2 is anchored in shoe 3 by teeth 4 provided in the number of four along one of the large sides of the lamella, said teeth 4 being embedded in shoe 3 over only part of their height (advantageously one half) so that between two successive teeth of the same lamella, there is an aperture 4a that effects communication between the spaces on either side of the lamella in question.

Figure 2:
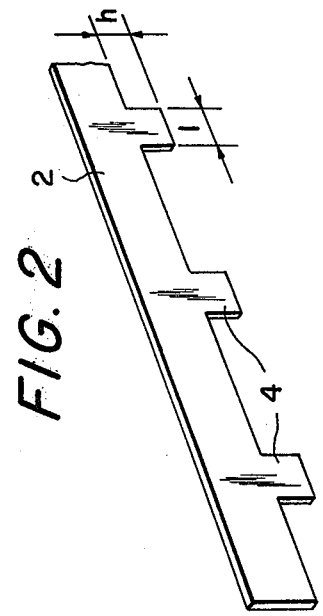
FIG. 2 is a view in perspective, with part cut away, of a powder lamella belonging to the propellant charge of said generator.

FIG. 2 shows part of such a powder lamella 2, whereof teeth 4 present a height or width $h$ of 2 mm and a length $l$ of 3 mm, the implantation depth of the teeth then being about 1 mm.

Figure 3:
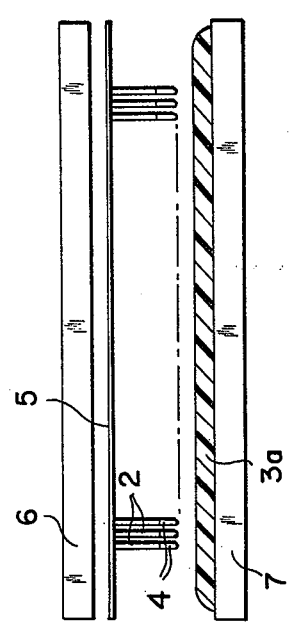
FIGS. 3 to 5 show schematically successive characteristic phases of a process according to the invention for the manufacture of the propellant charge of the generator illustrated in FIG. 1.
Figure 4:
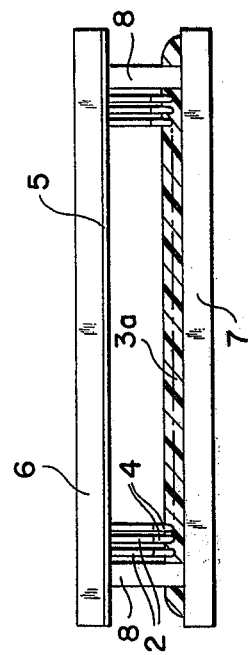
Figure 5:

To develop such a one-piece lamellar charge, there may advantageously be used a "flat" process, which leads to the production of a lamellar mat, the most characteristic phases of which process are schematically shown in FIGS. 3 to 5.

The above mentioned process comprises the following successive stages:

lamellae 2 are disposed edgewise parallel to each other with their teeth on the same side, presenting an interval between each two successive lamellae, the said lamellae being fixed in this arrangement by gluing their un-toothed edge to an adhesive strip 5 which is glued to a first plate 6, a second plate 7 receives a layer 3a of polymerizable silicone plastic material, which may be reinforced with glass fabric, at the start of the setting of said layer 3a, the first plate 6 is presented opposite second plate 7, after insertion of lateral insert elements 8 whose height in such that teeth 4 of lamellae 2 penetrate to half their height in layer 3a of the polymerizing plastic material, once polymerization of layer 3a has been completed, there is removal of plates 6 and 7 and adhesive strip 5, after which, the lamellar mat is cut, to obtain the desired dimensions.

FIG. 3 shows, in an exploded view, powder lamellae 2 joined by adhesive strip 5, the first plate 6 before gluing of said strip, and the second plate 7 with layer 3a of polymerizable plastic material.

FIG. 4 illustrates the presentation to each other of plates 6 and 7 with partial penetration of teeth 4 of powder lamellae 2 in layer 3a which is in the process of polymerization.

FIG. 5 finally shows the lamellar mat obtained after removal of plates 6 and 7 and adhesive strip 5 and after cutting of the polymerized layer that then constitutes the shoe 3 of said mat, which shoe has embedded in it teeth 4 of lamellae 2, up to half the height of said teeth.

It then suffices to roll this mat to a cylindrical configuration to obtain the annular propellant charge with lamellae 2 as illustrated in FIG. 1.

It is obvious, and derives moreover from what has already been said, that the invention is in no way limited to those of its modes of application and embodiments that have been specially indicated, but it includes on the contrary variants thereof.

We claim:

1. In a hot gas generator having a combustion chamber wall, a lamellar powder charge disposed along at least a portion of said wall, said powder charge including a unitary lamellar powder charge comprising a plurality of powder lamellae disposed side by side at regularly spaced intervals and fixed to a common shoe so as to project therefrom and define spaces between adjacent lamellae, each lamella being fixed to said shoe by spaced anchoring teeth formed in a marginal edge portion and embedded only partially in said shoe, such that the spaces between adjacent teeth on the same lamella form apertures communicating the spaces on each side of the lamella.

2. Apparatus as claimed in claim 1 wherein each lamella is quadrangular.

3. Apparatus as claimed in claim 2 wherein each lamella is generally rectangular and of a width between 5 and 50 mm.

4. Apparatus as claimed in claim 3 wherein the height and the length of the teeth projecting from the margin of each rectangular lamella are between one-tenth and one-third of the width of the lamella.

5. Apparatus as claimed in claim 4 wherein the anchoring teeth of each lamella are provided in a proportion of one tooth for every 2 to 6 centimeters along said marginal edge portion.

6. Apparatus as claimed in claim 3 wherein said marginal edge portion is of a length longer than the width of the lamella.

7. Apparatus as claimed in claim 1 wherein the depth of implantation of the teeth of each lamella is between one-fourth and three-fourths of the height of the teeth.

8. Apparatus as claimed in claim 1 wherein said shoe is configured such that one wall thereof lies adjacent the combustion chamber wall, and said lamellae project inwardly from the other wall thereof.

9. Apparatus as claimed in claim 8 wherein said shoe is configured as a cylinder, and said lamellae project radially inwardly therefrom along lines off fixation parallel to the longitudinal axis of the cylinder.

10. A lamellar powder charge mat for forming the powder charge of a hot gas generator, comprising a flexible shoe in the general form of a flat mat, and a plurality of powder lamellae upstanding from one face of the shoe in generally parallel orientations and adjacent but regularly spaced from each other, each lamella having anchoring teeth along one marginal edge portion, said teeth being formed as continuations of the lamella, said teeth being partially embedded in said shoe such that the spaces between adjacent teeth on the same lamella form apertures communicating the spaces on each side of the lamella.

* * * * *